United States Patent Office 3,324,127
Patented June 6, 1967

3,324,127
HYDROURACIL PROCESS
Robert R. Rafos, Lyndhurst, and Diane G. Farrington, Euclid, Ohio, assignors to The Standard Oil Company, Cleveland, Ohio, a corporation of Ohio
No Drawing. Filed Oct. 8, 1965, Ser. No. 494,255
12 Claims. (Cl. 260—260)

This invention relates to a novel process for the production of 1-substituted hydrouracils and more particularly relates to the process for producing 1-substituted hydrouracils by the hydrolysis of N-substituted-N-($\beta$-cyanoethyl) cyanamides.

The 1-substituted hydrouracils, also known as 2,4-diketo-5,6-dihydropyrimidines, have the structure

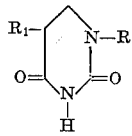

wherein R is a hydrocarbon group which may also contain one or more of halogen, oxygen, nitrogen, sulfur and phosphorous substituents having from 1 to 20 carbon atoms, $R_1$ is hydrogen, a halogen or an alkyl group having from 1 to 4 carbon atoms, and preferably R represents an aliphatic hydrocarbon group having from 1 to 12 carbon atoms, an aryl group having from 6 to 12 carbon atoms, an alicyclic group having from 3 to 12 carbon atoms, an alkaryl group having from 7 to 20 carbon atoms and an aralkyl group having from 7 to 20 carbon atoms and $R_1$ represents hydrogen or a methyl group.

Several methods for preparing substituted hydrouracils have been described previously. For instance, according to U.S. Patent No. 3,124,580, dihydrouracils are prepared by reaction of an N-(2-carbamylalkyl)-aromatic-alkylamine having the formula Ar—Y—NHCH$_2$CH(R)CONH$_2$ or an N-[2-(lower-carbalkoxy)alkyl] aromatic alkyl amine having the formula Ar—Y—NHCH$_2$CH(R)COO—(lower alkyl)

with a water soluble inorganic cyanate or urea.

Another procedure for the preparation of dihydrouracils comprises reacting a compound having the formula:

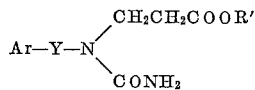

with an acidic agent. The reaction is run, preferably by reacting the ester or acid with strong mineral acids, for example HCl, HBr or H$_2$SO$_4$ in an aqueous or alcoholic medium. Although the reaction will take place at room temperature, the reactants are mixed and allowed to stand for long periods of time. In some steps of the previously described processes for the production of hydrouracil, the reactant mixtures are required to stand for twenty-two days.

The process according to the present invention involves the hydrolysis of N-substituted-N-($\beta$-cyanoethyl) cyanamides; the preparation of the substituted ($\beta$-cyanoethyl) cyanamides is described in detail in our copending U.S. patent application Ser. No. 486,539, filed Sept. 10, 1965.

The N-substituted-N-($\beta$-cyanoethyl) cyanamides can be prepared by the cyanoethylation of a primary amine having the formula RNH$_2$ wherein R has the foregoing designation with a compound having the formula

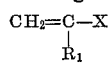

wherein $R_1$ has the foregoing designation and X represents a —CN, —COOR or —CONH$_2$ group such as acrylonitrile followed by reaction with a cyanogen halide such as cyanogen bromide as follows:

RNH$_2$+CH$_2$=CHCN→RNHCH$_2$CH$_2$CN

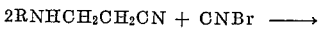
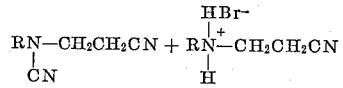

The N-substituted-N-($\beta$-cyanoethyl) cyanamide is converted to a 1-substituted hydrouracil as follows:

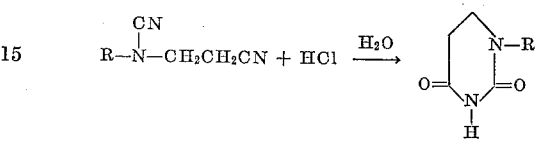

The hydrolysis is preferably carried out in the presence of an acid or a base catalyst. The most preferred hydrolysis catalysts are acids and include the strong mineral acids such as hydrochloric, sulfuric, phosphoric acid and strongly acid ion exchange resins, etc.

The present process is carried out at a temperature of from about 0° C. to 100° C. or higher and preferably at from about 30° C. to 100° C.

The process of this invention may be carried out at or near atmospheric pressure although the use of superatmospheric pressures is contemplated.

An alternate method for preparing the N-substituted-N-($\beta$-cyanoethyl) cyanamides involves the reaction of a primary amine with a cyanogen halide to form the substituted cyanamide and the substituted cyanamide is then reacted with acrylonitrile as follows:

2RNH$_2$+CNBr→RNHCN+HBr·RNH$_2$

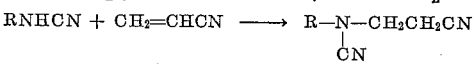

In all of the foregoing equations R has the designation earlier described in this specification.

A number of advantages are associated with the process of this invention. The present process produces generally better yields, is less complicated and is more economical than the known prior art processes.

The hydrouracils have utility as central nervous system depressants, in particular, anticonvulsant activity and they are also useful as inhibitors for the germination of plant seeds.

The process of this invention is further illustrated in the following examples.

*Example I*

Cyclohexylcyanamide and N-cyclohexyl-N-($\beta$-cyanoethyl) cyanamide were prepared according to our copending U.S. patent application Ser. No. 486,539, filed Sept. 10, 1965.

A. A solution of 26.5 grams of cyanogen bromide in 100 ml. of ethyl ether was placed in a 500 ml., 3-necked, round-bottomed flask fitted with a thermometer, condenser, dropping funnel and stirring bar. A solution of 49 grams of cyclohexyl amine in 75 ml. of ethyl ether was added dropwise with stirring over a period of 1⅓ hours. After stirring for an additional ½ hour, the solution was filtered and 4.31 grams of cyclohexyl amine hydrobromide were recovered. The cyclohexyl cyanamide was kept in a known volume of ether for use in B of this example.

B. A solution of 8.3 grams of cyclohexyl cyanamide in 20 ml. of tetrahydrofuran was placed in a 100 ml., 3-necked flask fitted with a condenser, thermometer, stirring bar and dropping funnel. A solution of 3.6 grams of acrylonitrile in 20 ml. of tetrahydrofuran was added dropwise with stirring. No reaction occurred until 1 ml. of 10% aqueous sodium hydroxide solution was added. At the end of 4 hours the solvent was removed to yield 8.9 grams of a yellow viscous N-cyclohexyl-N-(β-cyanoethyl) cyanamide.

C. 1-cyclohexyl hydrouracil was prepared by refluxing a 3.0 gram sample of N-cyclohexyl-N-(β-cyanoethyl) cyanamide with a solution of 26 ml. of water and 10 ml. of concentrated hydrochloric acid for 1½ hours. The reaction mixture was cooled to 0° C. and filtered. A yield of 2.6 grams of 1-cyclohexyl hydrouracil (78%) melting at 183–183.5° C. was obtained. The structure of this compound was confirmed by infrared analysis.

*Example II*

1-isopropyl hydrouracil was prepared by refluxing a mixture of 10.27 grams of N-isopropyl-N-(β-cyanoethyl) cyanamide and 50 ml. of a 1:1 by volume water:concentrated hydrochloric acid for 1 hour and 45 minutes. The reaction mixture was cooled and the volatiles were removed by evaporation. The solid residue was stirred and heated in tetrahydrofuran. The insoluble salt was removed by filtration and the product was crystallized from the filtrate. A 69% yield of 1-isopropyl hydrouracil was obtained which melted at 141.5–143.0° C. The structure was confirmed by infrared analysis.

*Example III*

1-(2,4-dichlorobenzyl)-5,6-dihydrouracil was prepared by refluxing a mixture of 10 grams of N-(2,4-dichlorobenzyl)-N-(β-cyanoethyl) cyanamide, 50 ml. of concentrated hydrochloric acid and 100 ml. of distilled water. After two hours of refluxing the solution was cooled and filtered to yield 11.7 grams (97% of theory) of crude solid product which had a melting point of 182–185° C. when recrystallized.

*Example IV*

A mixture of 21.4 grams of N-(4-chlorobenzyl)-N-(β-cyanoethyl) cyanamide, 30 ml. of concentrated hydrochloric acid and 30 mls. of distilled water was refluxed for two hours. The reaction mixture was then cooled, chilled and filtered to yield 22.3 grams of a crude product, 1-(4-chlorobenzyl)-5,6-dihydrouracil, which was recrystallized from a 60:40 mixture of ethanol:water to give 13.6 grams (60% yield) of a white crystalline product with a melting point of 173–174.5° C.

*Example V*

1-phenyl hydrouracil was prepared by the procedure described in Example I starting with N-phenyl-N-(β-cyanoethyl) cyanamide. A quantitative yield of product having a melting point of 193–194° C. was obtained.

*Example VI*

1-(4-chlorophenyl) hydrouracil having a melting point of 225–226° C. was obtained in 80% yield from N-(4-chlorophenyl)-N-(β-cyanoethyl) cyanamide prepared by the procedure described in Example IC.

*Example VII*

1-isobutyl hydrouracil, melting at 121.5–123° C. was obtained in 78% yield from N-isobutyl-N-(β-cyanoethyl) cyanamide prepared by the procedure of Example IC.

*Example VIII*

1-ethyl hydrouracil, melting at 129.5–131.5° C., was obtained in 73% yield from N-ethyl-N-(β-cyanoethyl) cyanamide prepared by the procedure of Example IC.

*Example IX*

1-methyl hydrouracil melting at 172.5–174° C. was obtained from N-methyl-N-(β-cyanoethyl) cyanamide prepared by the procedure of Example IC.

*Example X*

The procedure of Example I was repeated with similar results using ethyl acrylate in place of acrylonitrile.

*Example XI*

The procedure of Example I was repeated with similar results using methacrylonitrile in place of acrylonitrile.

*Example XII*

The procedure of Example I was repeated with similar results using acrylamide in place of acrylonitrile.

We claim:

1. The process for preparing a compound having the structure

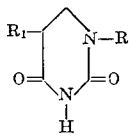

wherein R is hydrocarbon or halogen-containing hydrocarbon, or a methyl group having from 1 to 20 carbon atoms and $R_1$ is hydrogen or a methyl group comprising hydrolyzing a compound having the structure

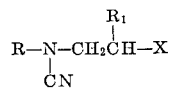

wherein R and $R_1$ have the foregoing designations and X is —CN.

2. The process of claim 1 carried out at a temperature of from 0° C. to 100° C.

3. The process of claim 2 carried out in the presence of a hydrolysis catalyst.

4. The process of claim 3 wherein R is cyclohexyl and $R_1$ is hydrogen.

5. The process of claim 3 wherein R is isopropyl and $R_1$ is hydrogen.

6. The process of claim 3 wherein R is 2,4-dichlorobenzyl and $R_1$ is hydrogen.

7. The process of claim 3 wherein R is 4-chlorobenzyl and $R_1$ is hydrogen.

8. The process of claim 3 wherein R is phenyl and $R_1$ is hydrogen.

9. The process of claim 3 wherein R is 4-chlorophenyl and $R_1$ is hydrogen.

10. The process of claim 3 wherein R is isobutyl and $R_1$ is hydrogen.

11. The process of claim 3 wherein R is ethyl and $R_1$ is hydrogen.

12. The process of claim 3 wherein R is methyl and $R_1$ is hydrogen.

References Cited

UNITED STATES PATENTS 3,124,580  3/1964  Surrey et al. -------- 260—260
3,261,861  7/1966  Johnson et al. ------ 260—465.5

OTHER REFERENCES

Cram et al.: Organic Chemistry, McGraw-Hill Book Company, New York, 1959, pages 78 and 223.

ALEX MAZEL, *Primary Examiner.*

MARY O'BRIEN, *Assistant Examiner.*